Nov. 22, 1927.
H. M. TAYLOR
KITCHEN UTENSIL
Filed Nov. 9, 1926
1,649,874
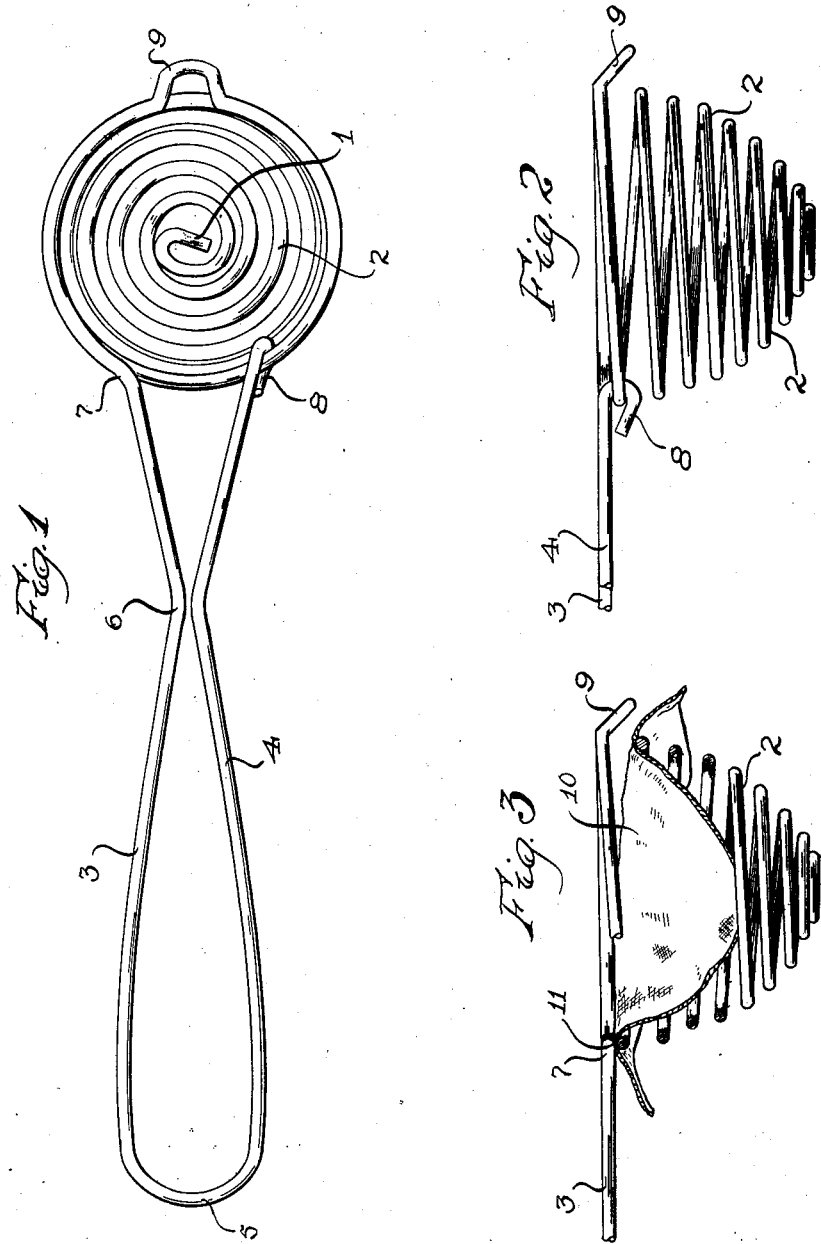
INVENTOR
Herbert M. Taylor
BY
H. H. Simms
his ATTORNEY Patented Nov. 22, 1927.

1,649,874

UNITED STATES PATENT OFFICE.

HERBERT MUNRO TAYLOR, OF ROCHESTER, NEW YORK.

KITCHEN UTENSIL.

Application filed November 9, 1926. Serial No. 147,330.

The present invention relates to kitchen utensils and the object thereof is to provide a structure which is capable of being employed in the kitchen for a large number of different purposes, as for instance, an egg separator, a ladle, a strainer for separating solids from liquids, as a coffee or tea strainer, or for separating fruits and vegetables from liquids and also as a beater for beating up cakes, eggs or whipped-cream or the like.

To these and other ends, the invention consists of certain parts and combinations of parts all of which will be herein after described: the novel features being pointed out in the appended claims.

In the drawings:

Fig. 1 is a plan view of the utensil constructed in accordance with this invention.

Fig. 2 is a side view with the handle broken away.

Fig. 3 is a fragmentary view of the body or bowl of the strainer.

In the illustrated embodiment of the invention, the utensil is formed from a single piece of heavy wire. In forming the utensil, one end of the wire is situated substantially at the center 1 of the bowl or body of the instrument and the wire then is bent into a number of successive spiral convolutions of increasing widths which gradually move away from the plane of the end so that a cup shape body is provided which is substantially semispherical in shape.

The handle of the utensil is also preferably formed in one piece of wire with the body and to this end the handle comprises two arms 3 and 4 connected at the outer portion by a reverse bend 5, deflected toward each other intermediately at their ends at 6, the arm 3 connecting with the end of the uppermost convolution by a bend 7, while the arm 4 is looped and bent around the uppermost convolution at 8 in spaced relation to the bend 7 or the inner end of the arm 3. The two arms 3 and 4 being spaced adjacent at ends such arms provide two points of contact for supporting the utensil over any suitable receptacle.

In order to provide a third support, a lip 9 is provided substantially in line with the longitudinal axis of the handle opposite the side from which the handle projects. In this instance, this lip is formed from the wire stock of the uppermost convolution of the body and is in the form of an outwardly and downwardly extending loop. By extending the loop downwardly the receptacle is received between the under face of the loop and the adjacent convolution of the body thereof effectively holding the utensil on receptacle. The downward deflection also makes the outer end of the loop substantially continuous with the perimeter of the body so that the utensil may be utilized for beating up cakes, eggs or whipped cream without interference by this projection.

In using the utensil as an egg separator the egg is broken over the cup like body which is supported over a receptacle and the white of the egg passes through the spaces between the convolutions while the yoke is retained in the body part of the utensil. When used as a strainer in canning fruits or vegetables, the utensil is employed for taking the fruit or vegetable from suitable receptacle so that all liquid matter is drained therefrom, and the fruits or vegetables are then placed in the canning receptacle by the utensil free from liquid matter. When used as a strainer for tea, coffee or the like requiring a finer strainer action, a strainer cloth 10 may be placed in the space between the upper and lower convolution so that it is gripped at 11 at one side at the bend 7. When liquids are poured into the cloth, the latter will as shown in Figure 3, substantially conform to the body or cup of the utensil. The device may be used as a ladle for removing boiled eggs, or fruits or vegetables from boiling water or it may be used for removing French fried potatoes or fried cakes from hot fats. The device may also be used for beating cakes, eggs and whipped cream like an ordinary spoon.

What I claim as my invention and desire to secure by Letters Patent is:

1. A kitchen utensil comprising a cup shaped body formed from a length of wire, one end of which is situated substantially at the center of the cup and from which the wire proceeds in substantially spiral convolutions of gradually increased diameters, a handle connected to the uppermost convolution at one side of the body, and a loop formed from the uppermost convolution substantially in line with the handle.

2. A kitchen utensil comprising a cup shaped body formed from a length of wire, one end of which is situated substantially at the center of the cup and from which the wire proceeds in substantially spiral convolutions of gradually increasing diameters a handle connected to the uppermost convolution at one side of the body, and a loop formed from the uppermost convolution substantially in line with the handle said loop being deflected downwardly.

3. A kitchen utensil comprising a cup shaped body formed from a length of wire, one end of which is situated substantially at the center of the cup and from which the wire proceeds in substantially spiral convolutions of gradually increasing diameters, and a handle formed from the same piece of wire into two arms, one of which is a continuation of the uppermost convolution of the cup shaped body and the other of which has its inner end secured to the uppermost convolution in spaced relation to the point where the first mentioned arm projects from such convolution, the upper convolution having an outwardly extending loop formed therein at a point substantially in line with the handle.

HERBERT MUNRO TAYLOR.